April 5, 1949.  J. S. GILBERTIE  2,466,226
RODENT PROOF FRUIT AND VEGETABLE CONTAINER
Filed Feb. 5, 1946
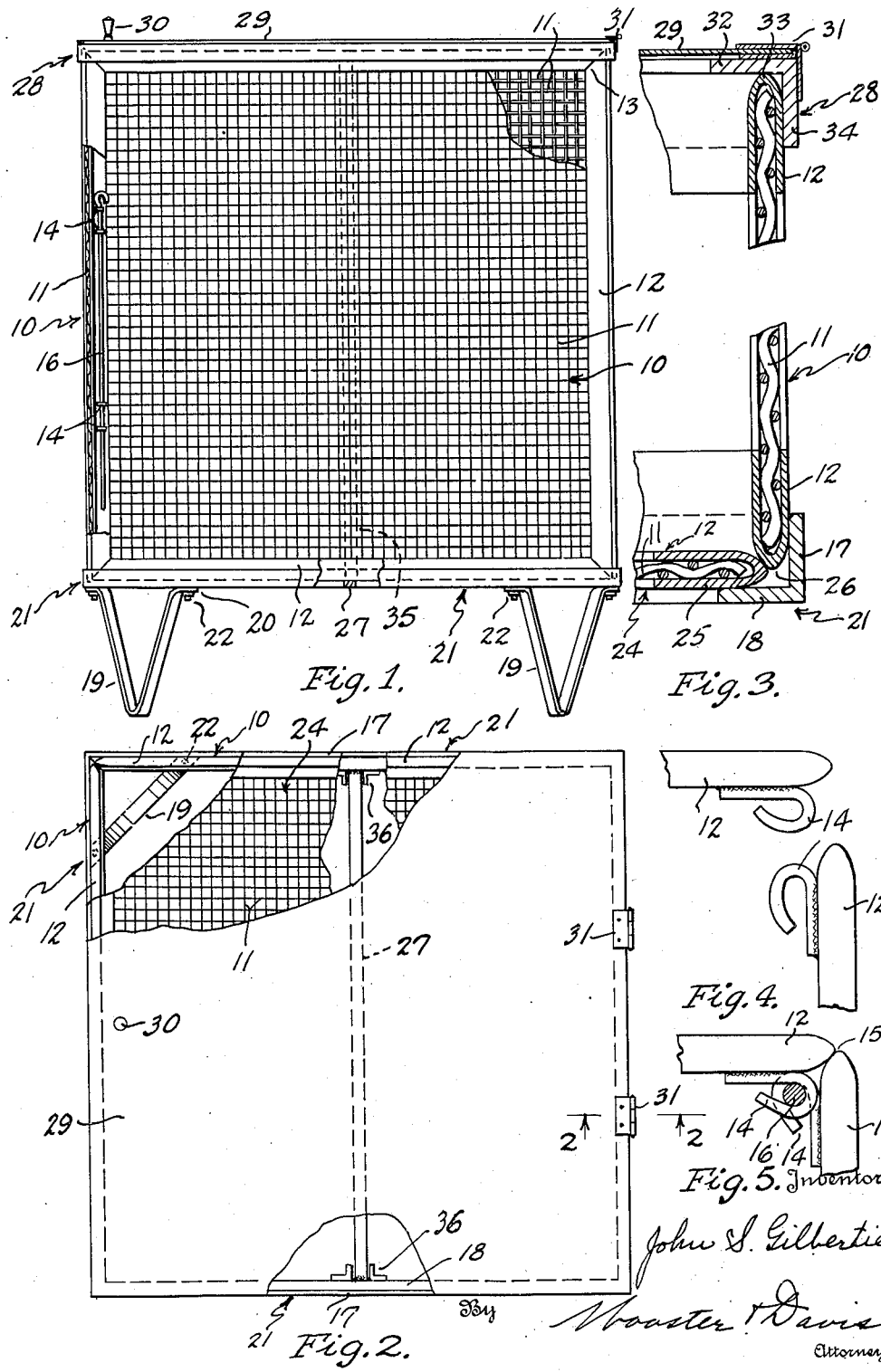

Patented Apr. 5, 1949

2,466,226

UNITED STATES PATENT OFFICE 2,466,226

RODENTPROOF FRUIT AND VEGETABLE CONTAINER

John S. Gilbertie, Westport, Conn.

Application February 5, 1946, Serial No. 645,529

5 Claims. (Cl. 220—4)

This invention relates to a container used for storing perishable foods, such as fruits and vegetables.

It has for its object to provide a container for various articles of food, such as fruits and vegetables, so constructed that its contents are not accessible to rodents, for example, rats and mice.

It has for its further object to provide a strong container such as is heretofore described, which is capable of being disassembled easily so that it may be stored away when not in use, and also will require a minimum of space in shipping or storing. This feature is a very desirable one, in that the necessity for storing fruits and vegetables is seasonal, and since my device can be disassembled so that it is not bulky, my container can be stored in a relatively small space when not in use.

With the foregoing and other objects in view, I have devised the construction illustrated in the accompanying drawing forming a part of this specification. It is, however, to be understood the device is not limited to the specific details of construction and arrangement shown, but may embody various changes and modifications within the scope of the invention.

In the drawing:

Fig. 1 is a side view, with portions removed to show a typical construction;

Fig. 2 is a top plan view with portions removed to show the construction;

Fig. 3 is a detail section on an enlarged scale taken substantially on line 2—2, Fig. 2;

Fig. 4 is a detail showing a part of the means of joining the sides of the container together, and in separated relation, and Fig. 5 is a view showing them connected.

The invention comprises several panels 10, similarly constructed, and secured together by some detachable means so that the container may be set up and after use taken down and stored with the panels lying one on top of the other so that it will occupy a minimum of space. The panels 10 are constructed of wire mesh 11, of any desired size, a half-inch mesh having been found very satisfactory for vegetables and similar articles, such as potatoes, carrots, apples, and so forth, fastened by some means such as soldering into a U-shaped member 12, constructed of a material such as metal, which could not be gnawed by rats or mice. These U-shaped pieces when fastened together at the corners by a means such as welding, form a continuous rim or frame around the wire, making a completed rigid panel. The U-shaped member 12 may be constructed of wood. In this case it can be seen the panel is so constructed that the wire 11 is encased by the frame 12, preventing a rat, for example, from gnawing through the frame. If it is desired to keep small insects, such as flies out of the container, small mesh screening may be placed over and fastened to the wider mesh screen of which the panel is constructed.

The several panels 10 are joined together by some suitable detachable means so that when upright and joined they form the four sides of a container or compartment, which may be dismantled and stored conveniently.

A detachable means which may be used to join the panels together consists of several hooks or loops 14 attached, for example, by soldering or welding to the frame 12. Two or more of these hooks may be fastened to each end of the frame on that part of the frame which faces the interior of the container, and thus when two edges of the frame are butted together, as indicated at 15, at substantially right angles the hooks or loops are in such a position that a rod 16 may be passed through the hooks, thus holding them together. This means is duplicated at each of the four corners of the device, thus joining the four sides, forming a container.

The bottom of the container comprises a frame of angle members or bars, such as angle irons, arranged with the outer flanges 17 vertical and the other flanges 18 horizontal and at the bottom. These angle members are joined at their ends by some means, such as welding, so that a continuous frame, substantially rectangular in shape, is formed. This frame is supported by a series of legs or supports 19, which consist in this instance of metal strips, bent to form a V as shown, and having laterally extending feet 20 fastened to the adjacent sides of the frame 21 by means of bolts 22 through the horizontal flange 18 and the leg 19. The legs 19 may be permanently welded to the frame 21, but it is preferred to secure them by the bolts so they are detachable and can be stacked with the panels when the container is in the knockdown condition so it will occupy a minimum of space. A mesh panel 24 similar in construction to the side panels 10 is made of such a size that when placed on the bottom frame 21, heretofore described, the rim 25 of the panel 24 will rest on the horizontal flanges 18 of the frame 21. A supporting metal strip 27 spanning the frame 21 from side to side, and fastened to the frame by a means such as welding, gives additional support to the mesh panel 24, when the container is filled.

The four side panels of the container are of such size and shape that when joined together at their corners by a suitable means, such as has been heretofore described, and then placed on the bottom of the container, the bottom edges 26 of the panels 10 will be within the vertical flanges 17 of the frame 21, and will be supported by the horizontal flanges 18 of the frame 21.

To form a completely enclosed container a cover or top is provided. It consists of a metal frame 28, constructed identical to the bottom frame 21, to which is attached a lid 29 made of sheet metal or other suitable material. The lid 29 is provided with a handle 30 and is fastened permanently to the frame 28, preferably by means of hinges 31. The frame 28 of the top of the container is, as previously mentioned, constructed identical to the bottom frame 21. Thus, when the top is placed upon the four side panels 10, the horizontal flange 32 of the frame 28 will rest on the upper edge 33 of the panels 10, while the vertical flange 34 will overlap the panels 10.

It may be desired to divide the container into different compartments so that several types of fruits and vegetables may be stored in the same container. In this case, one or more additional panels 35 like the side panels may be provided and be held within the container by means of guides 36 fastened in the proper position to the interior of the side panels or the upper and lower frames.

From the specifications given, it can be seen that I have constructed a strong container, capable of being erected easily, and which may be readily dismantled and stored in a relatively small space. To erect the container, the bottom frame 21 supported by its legs 19, is placed on a floor or platform, the bottom panel 24 is then placed on the frame. Next, the four side panels 10 are joined together by butting their vertical edges 15 together and then passing the metal rod 16 through the respective hooks or loops 14. The four sides 10 are then placed on the bottom frame 21, the sides being overlapped by the vertical flange 17 of the frame 21 and supported by the horizontal flange 18 of the frame 21. The cover or top frame 28 is then placed on the sides 10, the horizontal flange 32 of the panel 28 resting on the top edges 33 of the sides 10, with the vertical flange 34 overlapping the side panels 10.

To dismantle the container, the above outlined procedure is simply reversed.

It will be clear that even though my container may be easily erected and dismantled, the corners are so constructed that it is impossible for a rat or mouse to chew into them, thus gaining access to the contents of the container.

Any suitable construction can be used for the panels 10. For example, they may be constructed of perforated sheet metal or wire mesh covered wooden frames or any rodent proof construction. Instead of the V-shaped legs shown, any suitable other construction may be used, such as roller casters, for example.

Having thus set forth the nature of my invention, I claim:

1. A container of the character described comprising a base frame of connected angle bars arranged with one flange horizontal and the upright flange at the outer edge of the first flange, a bottom panel resting on the horizontal flanges, separate upright side panels arranged with their lower edges in the lower frame at the inner sides of the upright flanges and each comprising open wire mesh in an open frame forming a border for said mesh, aligned loops mounted on the adjacent edges of the panels at the corners of the container, a rod extending through the loops at the respective corners to detachably secure the panels together, a top frame similar to the bottom frame in inverted position resting on the top edges of the side panels, and a cover for the container hinged to the top frame.

2. A container of the character described comprising a base frame of connected angle bars arranged with one flange horizontal and the other upright at the outer edge of the first flange, supporting legs for said frame, separate upright side panels each comprising a frame of connected substantially U-shaped bars embracing the edges of an open wire mesh, said panels resting at their lower edges in the base frame with their lower edges at the inner sides of the upright flanges, a similar open mesh panel resting on the horizontal flanges forming the bottom of the container, a top frame of connected angle bars arranged with a horizontal flange seating on the top edges of the side panels and the other flange at the outside of the panels, means for detachably connecting the side panels together at their adjacent upright edges, and a cover for the container hinged to the top frame.

3. A container of the character described comprising top and bottom frames each formed of connected angle bars arranged with one flange horizontal and the other flange upright at the outer edge of the horizontal flange, said frames being arranged with their upright flanges extending toward each other, separate bottom and side panels each comprising an open mesh screen mounted at its edges in an open frame of connected bars, said bottom panel resting on the horizontal flanges of the bottom frame and the side panels being arranged with their upper and lower edges in the top and bottom frames respectively at the inner sides of the upright flanges of these top and bottom frames, means for detachably securing the adjacent side panels together, and a cover for the container mounted on the top frame.

4. A container of the character described comprising top and bottom frames each formed of connected angle bars arranged with one flange horizontal and the other flange upright at the outer edge of the horizontal flange, said frames being arranged with their upright flanges extending toward each other, separate bottom and side panels each comprising an open metal frame of substantially U-shaped bars and an open mesh screen mounted with its edges embraced by said bars, the bottom panel being mounted on the horizontal flanges of the bottom frame, the side panels being arranged in an upright position with their top and bottom edges in the top and bottom frames respectively and at the inner sides of the upright flanges of these top and bottom frames, loops mounted on the upright bars of the side panels with the loops of the adjacent panels in alignment, a connecting rod detachably passing through the aligned loops to secure the panels together, and a cover for the container mounted on the top frame.

5. A container of the character described comprising top and bottom frames each formed of connected angle bars arranged with one flange horizontal and the other flange upright at the outer edge of the horizontal flange, said frames being arranged with their upright flanges extending toward each other, supporting legs for the bottom frame, separate bottom and side panels each comprising an open frame of connected metal bars and an open mesh screen secured at its edges to said bars, said bottom panel being mounted on the horizontal flanges of the lower frame, the side panels being arranged in upright positions with their top and bottom edges in the top and bottom frames respectively at the inner sides of the upright flanges of these top and bottom frames, means for detachably connecting the adjacent edges of the side panels together, guides at an intermediate location on opposite sides of the container adapted to removably receive an upright division panel to divide the container into separate compartments, and a closure cover for the container mounted on the top frame.

JOHN S. GILBERTIE.

REFERENCES CITED

The following references are of record in the file of this patent:

UNITED STATES PATENTS

| Number | Name | Date |
|---|---|---|
| 1,199,556 | Johnson | Sept. 26, 1916 |
| 1,890,983 | Griffith | Dec. 13, 1932 |

FOREIGN PATENTS

| Number | Country | Date |
|---|---|---|
| 312,282 | France | July 2, 1901 |
| 516,515 | France | Dec. 8, 1920 |